United States Patent [19]

Stier

[11] 4,018,109
[45] Apr. 19, 1977

[54] FEED DEVICE FOR SAW MACHINING APPARATUS

[75] Inventor: Otto Stier, Biberach an der Riss, Germany

[73] Assignee: Vollmer Werke Maschinenfabrik GmbH, Germany

[22] Filed: Aug. 27, 1975

[21] Appl. No.: 608,381

[30] Foreign Application Priority Data

July 31, 1975   Germany .................... 2534289

[52] U.S. Cl. .................................................. 76/77
[51] Int. Cl.² ........................................ B23D 63/08
[58] Field of Search ....................... 76/35, 75, 77

[56] References Cited

UNITED STATES PATENTS

| | | | |
|---|---|---|---|
| 2,356,448 | 8/1944 | Daggett | 76/77 X |
| 2,484,438 | 10/1949 | Whetstine | 76/35 |
| 2,722,852 | 11/1955 | Anderson | 76/77 X |
| 2,855,809 | 10/1958 | Kaiser | 76/77 |
| 2,986,047 | 5/1961 | McConnell | 76/77 X |
| 3,850,052 | 11/1974 | Stier | 76/77 |

Primary Examiner—Al Lawrence Smith
Assistant Examiner—Nicholas P. Godici
Attorney, Agent, or Firm—Hill, Gross, Simpson, Van Santen, Steadman, Chiara & Simpson

[57] ABSTRACT

A feed device for machines which act on saw teeth, to sharpen the teeth, position the teeth, add hard metal plates to the teeth or the like, which accommodate wide pitch distances between saw teeth and variations in pitch distances between the teeth of the saw. The feed device includes a first reciprocal feed pawl which advances the saw a preset distance on each stroke and a second reciprocal feed pawl which additionally advances the saw to accommodate wide pitch distances between saw teeth and variations in saw tooth pitch patterns.

12 Claims, 8 Drawing Figures

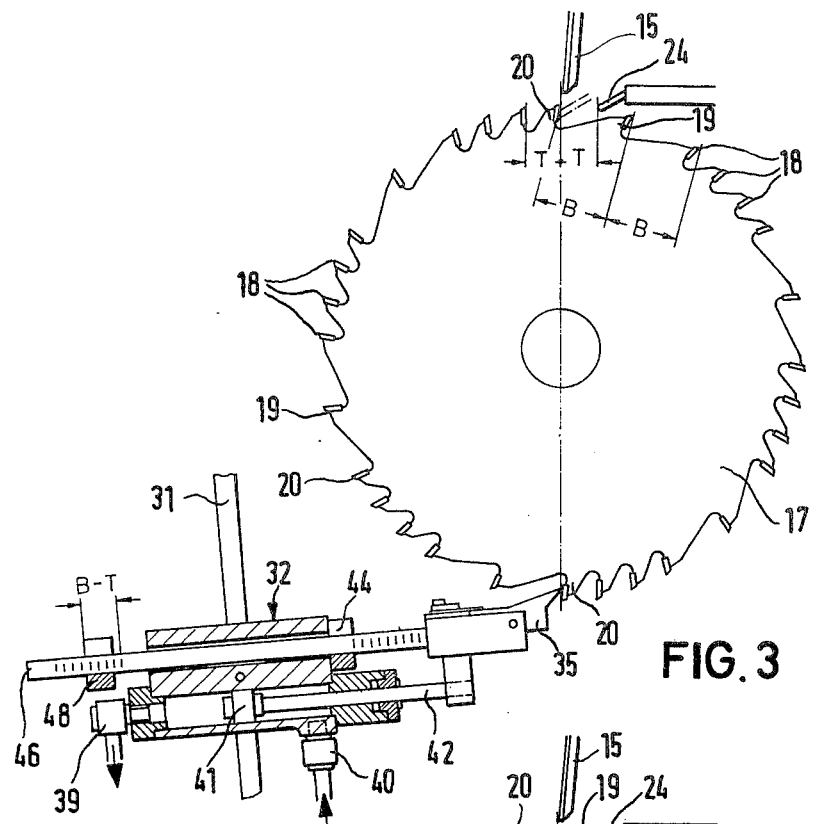
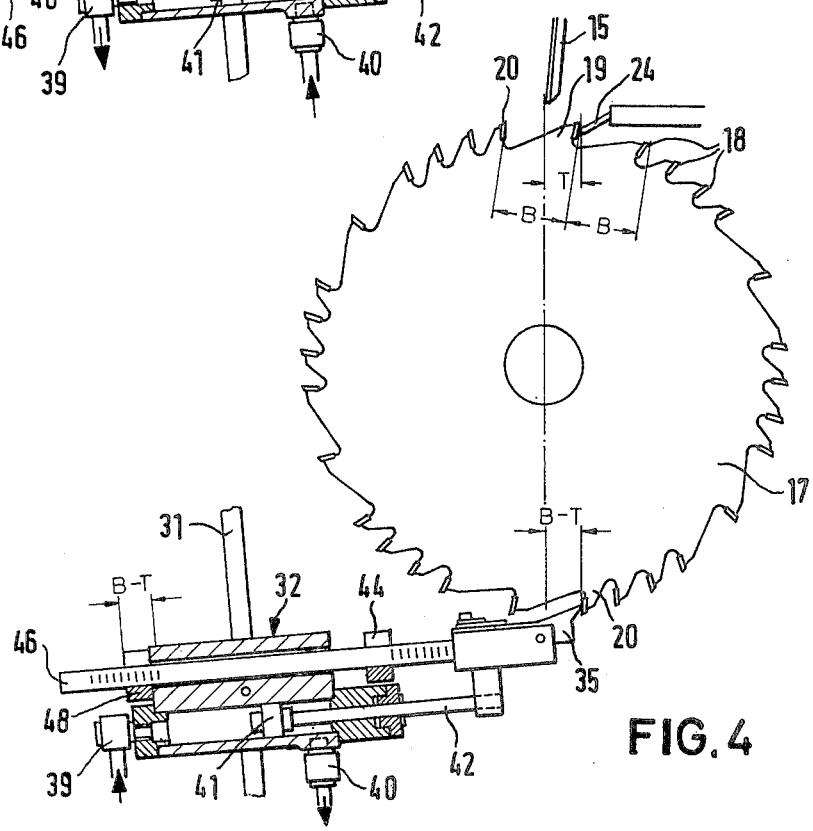

FEED DEVICE FOR SAW MACHINING APPARATUS

BACKGROUND OF THE INVENTION

1. Field of the Invention

This invention relates to the art of saw machining apparatus and particularly to feed devices for such apparatus. The feed devices of this invention include a first reciprocating pawl mechanism which advances a saw a preset distance in a saw machining apparatus, and a second reciprocating pawl mechanism movable between strokes of the first mechanism and cooperating with the first mechanism for advancing the saw an additional preset distance. The two mechanisms cooperate so that a saw tooth will be properly positioned to be acted on by the machine regardless of the pitch distances between the saw teeth. The feed devices of this invention are particularly useful with saws having very wide spacings or pitch distances between teeth or having variations in the pitch distances as, for example, in saws having groups of teeth of the same pitch separated by teeth of increased or lessened pitch.

2. Prior Art

Heretofore, feed devices for saw machining apparatus such as saw sharpening machines included a single reciprocal pawl advancing the saw in the machine a preset distance. These devices did not satisfactorily accommodate saws of great pitch distances between teeth or saws having variable pitch distances between teeth or groups of teeth.

SUMMARY OF THIS INVENTION

According to this invention machine which perform semi or fully automatic working operations at the teeth of belt saws, gang saws, circular saws, and particularly machines that correct the positions of saw teeth, sharpen the teeth, or provide the teeth with hard metal plates, are improved with feed devices having cooperating first and second reciprocal tooth engaging pawls. Saw sharpening machines for which the feeding device of this invention is particularly useful, include any machine making the teeth of belt saws, gang saws, circular saws and the like ready for use by grinding or sharpening operation either by grinding for the first time teeth that have been roughly worked by other operations or by resharpening the teeth of saws that have become blunt in use. In such machines, a feeding pawl engages the breast surface of the tooth of the saw mounted in the machine during each advancing stroke and moves the saw in a direction opposed to the direction of cut. An advancing stroke therefore involves movement of the saw in a direction opposite to the direction in which it moves during its cutting stroke.

The machining position of a tooth of a saw in such machines is that position in which the saw machining apparatus performs an operation on the saw tooth. In a saw sharpening machine, the machining position is that position in which a grinding disc plunges along the breasts or along a flank or side face of the tooth down to the root of the tooth.

As indicated above known saw feeding devices of the type described are only suited for saws having a constant tooth pitch, i.e., equal distances between all of the teeth and the tooth pitch cannot be greater than the greatest possible stroke of the feeding pawl.

It is then an object of this invention to provide a feeding device for saw machining apparatus that will correctly position the teeth of saws having a wide tooth pitch as compared to the stroke of the feeding pawl.

Another object of the invention is to provide a saw feeding device for saws having periodically changing tooth pitches.

Another object of the invention is to provide a saw feeding device that will sequentially position differently designed teeth in exactly a predetermined machining position in a saw machining apparatus.

A specific object of the invention is to provide a saw feeding device for saw machining apparatus which will correctly position in the apparatus the teeth of circular saws having a plurality of equal groups of teeth each having one or more large teeth separated by wide pitch distances and suitable for planing or broaching and a plurality of teeth separated at lesser pitch distances so that all of the teeth of all of the groups are properly machined as by oblique or straight grinding or by straight grinding the large teeth and oblique grinding the other teeth.

The objects of this invention are obtained by an additional pawl in the feed mechanism of saw machining apparatus which is moveable in an optional pattern between strokes of the main feeding pawl from a starting position to an end position of its own so that the additional pawl advances a tooth by an adjustable distance and returns to its starting position with the end position of the pawl having a distance from the starting position of the feeding pawl that equals zero or equals the distance between two or a plurality of successive teeth wherein the sum of one advance stroke each of the feed pawl and the additional pawl at least equals the greatest distance occurring between adjacent teeth of the saw. The feature of moving the additional pawl in an optional pattern between the strokes of the feeding pawl provides that the additional pawl, depending on the design to be machined, performs its own advance stroke, or when required two or more advance strokes of its own either prior to each individual advance stroke of the feeding pawl or prior to each second, third, fourth, etc. advance stroke of the feeding pawl.

It is usual in saw feeding devices of the type described that the final position of the feeding pawl at the outset, is determined and preferably coincides with the machining position of the saw tooth whereas the starting position of the feed pawl is adjustable so that the feed pawl can move variable positions away from its determined end position upon each return stroke in response to the tooth pitch of the saw to be machined. Such adjustability of the starting position of the feeding pawl is also useful with the saw feeding device of this invention.

In accordance with a preferred embodiment of the saw feeding device of this invention, the starting position and the end position of the additional pawl are determined by one adjustable stop for each position.

Preferably the adjustable stops are each provided with a readable scale so that when both stops are adjusted to a zero position the strole of the additional pawl equals zero and, upon adjustment of the stops into the direction of increasing scale values, the end position moves forward in a feeding direction and the starting position moves in a rearward direction.

This preferred embodiment, when used in a circular saw machining apparatus, is preferably improved so that upon adjustment of the stop defining the starting position of the additional pawl to its zero position, the additional pawl is located in its starting position diametrically opposite the end position of the feeding pawl.

In all of the above described embodiments, the additional pawl and the feeding pawl are preferably adapted to be driven by their separate motors with each of these motors controlled by a pulse generator operating in a usual manner during the stroke of the saw machining apparatus with the motor for the additional pawl being controlled by a switch which in turn is controlled by a step-by-step switch or relay system. The motor for the feeding pawl is preferably controlled by a delay switch or by an end switch actuated by the additional pawl in the end position thereof.

The delay switch in the control circuit of the motor is preferably bridged by the switch controlling the step-by-step switch system when this latter switch is in its idle position in which the additional pawl is inoperative.

BRIEF DESCRIPTION OF THE PREFERRED EMBODIMENTS

In The Drawings

FIG. 3 is a side view of parts of the saw feeding device in a first operating position when advancing a first embodiment of a combination circular saw;

FIG. 4 is a side view corresponding to FIG. 3 showing the saw feeding device in a second operating position;

AS SHOWN ON THE DRAWINGS

Figure 1:
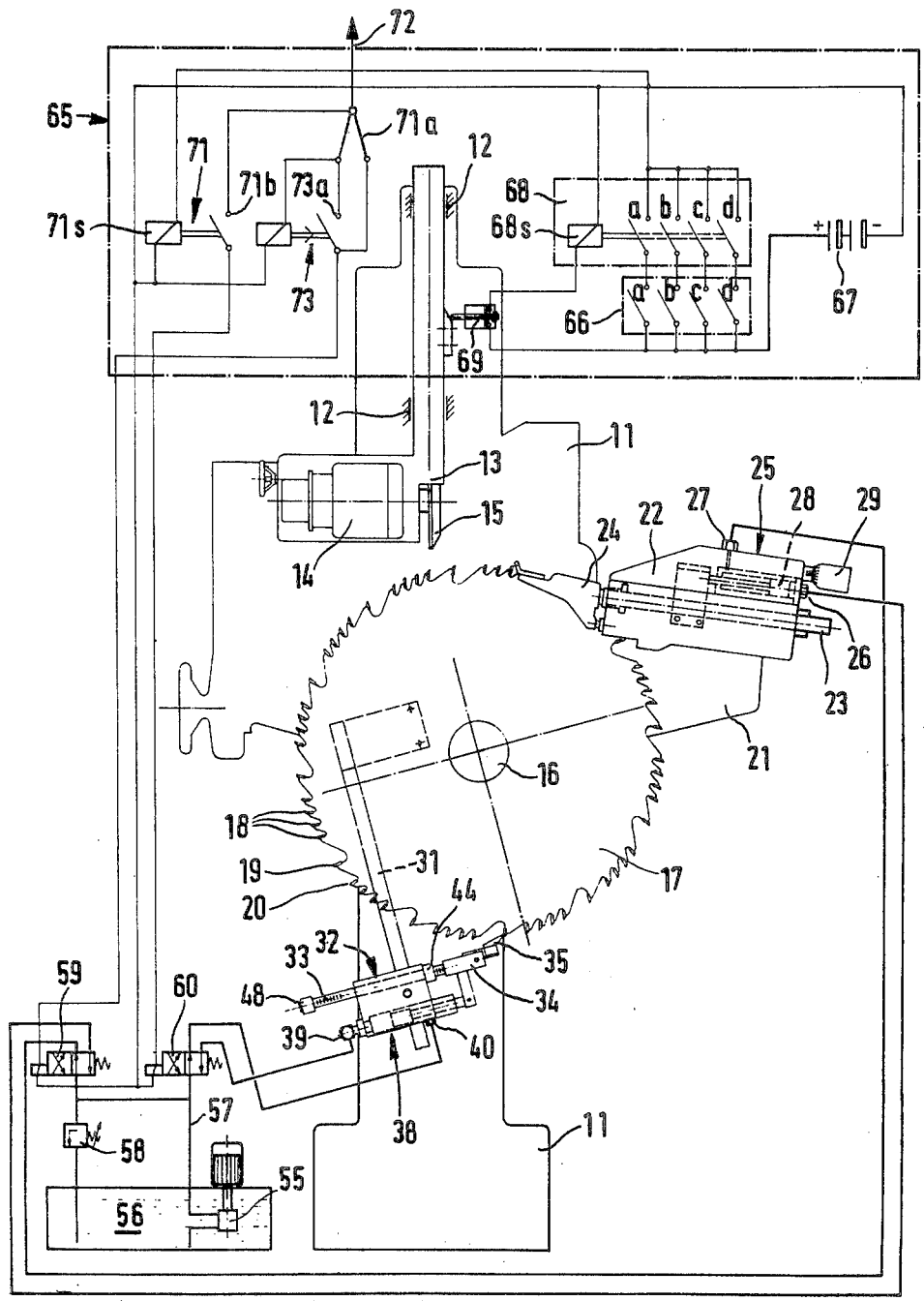
FIG. 1 is a somewhat diagrammatic side elevational view of a saw sharpening machine equipped with a feeding device of this invention and illustrating hydraulic electric switching elements and circuitry.

In FIG. 1 the reference numeral 11 illustrates the outline of a box type machine frame for a saw sharpening machine equipped with the saw feeding device of this invention. The machine frame 11 has vertical guides 12 slidably mounting a push-rod or ram 13 for up and down reciprocal movement. The ram 13 carries an electric motor 14 driving a grinding disc 15.

The central portion of the machine frame 11 carries a horizontal axis mounting 16 on which a circular saw 17 of a combination tooth type is rotatably supported. The teeth of the saw 17 are divided into a plurality of groups, each of which has three small teeth 18, a first large tooth 19 and a second large tooth 20. This saw 17 represents the first embodiment of a combination circuar saw referred to in the description of the FIGS. 3 and 4 of the drawings.

As also shown in FIG. 1, the machine frame 11 has a laterally extending upper arm 21 on which a housing 22 is adjustably mounted. A rod 23 is slidably guided in the housing approximately tangentially to the saw and at the left-hand end of the rod 23, a feeding pawl 24 is resiliently supported in such a manner that it tends to assume the position in FIG. 1 with respect to the rod 23, but can be resiliently deflected radially outward with respect to the saw 17. A motor 25 is provided to displace the rod 23 and in the illustrated example of FIG. 1, this motor is a double acting hydraulic piston and cyliner unit having two pressure fluid inlets 26 and 17 and a piston 28 secured to the rod 23. The piston 28 and the feeding pawl 24 are shown in FIG. 1 in a right-hand starting position that can be adjusted by means of an adjusting screw 29.

Figure 2:
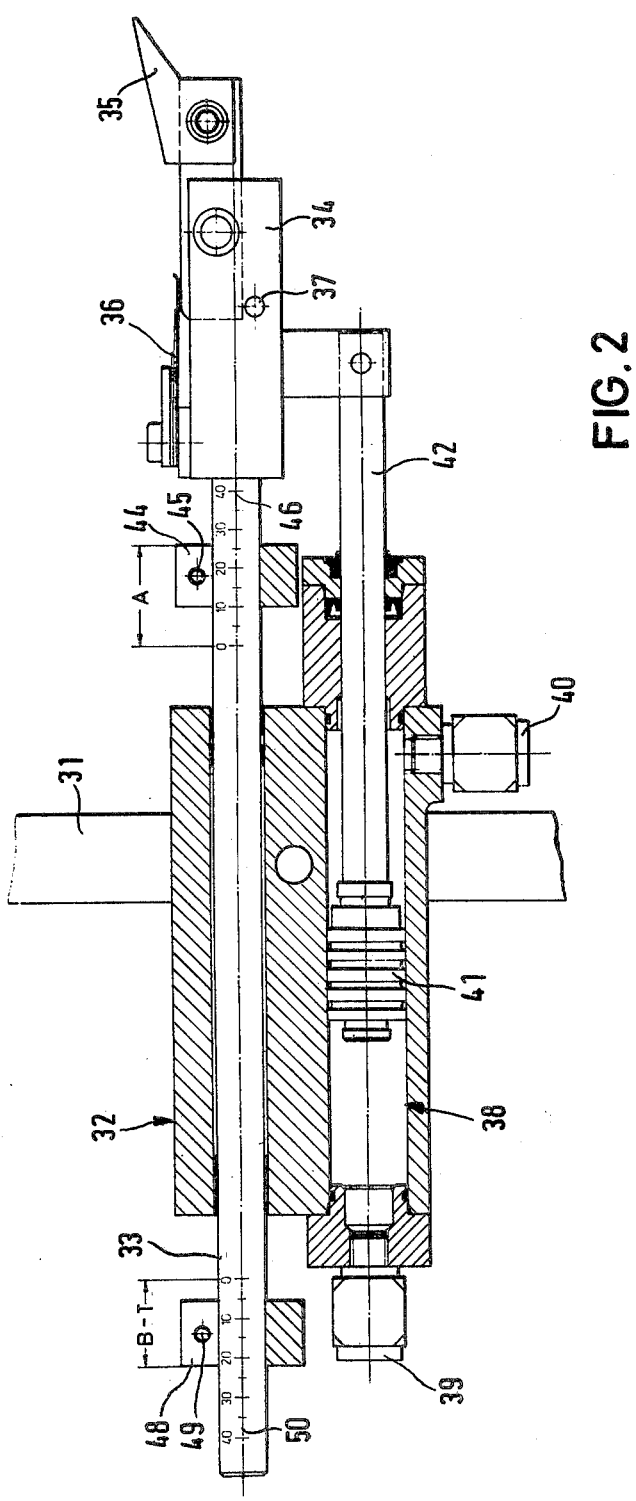
FIG. 2 is a side elevational view, partially in vertical section, showing part of the saw feeding device on a larger scale than in FIG. 1.

The machine frame 11 also has a lower arm 31 on which a housing 32 is adjustably secured. A rod 33 is slidably guided in the housing 32 in a direction approximately tangentially to the saw 17, but offset with respect to the rod 23 by about 180°. A block 34 is mounted on the right-hand end of the rod 33 and a second pawl 35, better shown in FIG. 2, is pivotally supported on this block. As also shown in FIG. 2 a stack of leaf springs 36 is mounted on the block 34 urging the pawl 35 to its illustrated position where it rests on a pin 37 fixed to the block 34. A motor 38 is arranged in the housing 32 and in the illustrated embodiment is also a double acting hydraulic piston and cylinder unit with two pressure inlets 39 and 40 and with a piston 41 on the end of a piston rod 42 secured to the block 34. The members connected with the additional pawl 35 are similar to the members connected to the feeding pawl 24 of FIG. 1.

The rod 33 and pawl 35 are shown in a starting position in FIG. 1 that is variable controlled by an adjustable stop nut 44 which in the illustrated embodiment shown in FIG. 2 is a split ring that can be clamped in a selected position on the rod 33 by means of a clamping screw 45. A scale 46 imprinted on the rod 33 is associated with this stop 44, which scale can easily be read at the right-hand end face of the stop 44. As illustrated the stop 44 is shown as mounted in a position corresponding to 26 units of the scale 46. In a zero position of the stop 44, its left-hand end face would abut the right-hand end face of the housing 32. Adjustment of the stop 44 from zero to 26 units on the scale is illustrated by the arrowed line A.

The left-hand end section of the rod 33 is likewise provided with a stop 48 composed of a slotted ring which is adjustably mounted on the rod 32 by a clamping screw 49 and a scale 50 is associated with this stop 48 similar to the scale 46 so that adjustment of the stop with respect to the scale can be read at the left-hand end face of the stop 48. As shown in FIG. 2 the stop is positioned at 22 units of the scale and has an adjustment to a zero position where its right-hand end face will abut against the left-hand end face of the housing 32. The adjustment is referred to by the arrowed line B-T.

The hydraulic motors 25 for the first feed pawl 24 and 38 for the second feed pawl 35 are supplied with pressure fluid by a single pump 55 as shown in FIG. 1. This pump 55 pumps the fluid from a reservoir 56 to circulating tubing 57 having an overflow or relief valve 58. Two electromagnetically controlled four-way valves 59 and 60 are mounted in the circulation tubing 57 with the valve 59 being connected to the two pressure inlets 26 and 27 of the motor 25 and the second valve 60 being connected to the two pressure inlets 39 and 40 of the motor 38. These four-way valves 59 and 60 are controlled by an electric control 65 shown in the block diagram of FIG. 1.

The control 65 includes a program switch 66 with a plurality, such as four contacts 66a, b, c and d actuated either manually, by means of a punched program card, a program plate inserted or placed therein, or the like. This program switch 66 is located between the positive pole of a voltage source 67 and a step-by-step or relay switch system 68 with a number of contacts corresponding to the number of contacts of the program switch. In the illustrated example, there are four contacts 68a, b, c, and d, as well as coil 68s. The circuit of coil 68s of the switch 68 includes an end switch 69 that is closed when the push rod 13 has reached its upper position or at least a raised position where the grinding disc 15 no longer contacts the saw 17.

A coil 71s of an electromechanical relay 71 with contacts 71a and 71b is connected to the step-by-step switch system 68. The contact 71a connects a pulse generator 72 to the coil of the electromagnetically controlled four-way valve 59. The pulse generator 72 is diagrammatically indicated in FIG. 1 as operating in the stroke of the saw sharpening machine. This connection is effected directly by contact 71a when the coil 71s is de-energized but when the coil 71s is energized, the connection is via a contact 78a of a delay switch 73. The contact 71b of the relay 71, in its closed position connects the pulse generator 72 with th coil of the four-way valve 60.

OPERATION OF THE SAW FEEDING DEVICE

As shown in FIGS. 1 and 3, when the last tooth of a group of three small teeth 18 of the saw 17 has been sharpened, the ram 13 carrying the grinding wheel 15 is moved to its upper end position, free of the saw. Consequently, the switch 69 is closed and coil 68s of the switch system 68 is energized moving this system by one step to close the contact 68a. Under the condition that the contact 66a of the program switch 66 has been manually closed or closed by means of a punch card or by means of a program plate or the like, current will flow through the switch 66 and the switch system 68 through the coil 71s of the relay 71 moving the contact 71a of the relay 71 to the position shown by the dash-line FIG. 1 and contact 71b is closed. Through this closed contact 71b, the next pulse generated by the pulse generator 72 reaches the coil of the valve 60. The pulse of all pulses of the pulse generator are electrically positive. The four-way valve 60 which has assumed the idle position of FIG. 1 is then changed over by this pulse so that the pressure medium inlet 39 of the motor 38 is put under pressure and the pressure medium inlet 40 is relieved to the reservoir 56. Consequently, the piston 41 of the motor 38 is moved from its starting position of FIGS. 1 and 3 to an end position. The starting position is exactly diametrically opposite to the machining position in which the tooth 20 was sharpened by the grinding disc 15 and the end position is determined by the stop 48 abutting against the housing 32 as shown in FIG. 4.

As shown in FIGS. 3 and 4, the distances designated by the arrowed lines B are the distances between the last small tooth 18 and the first large tooth 19, as well as the distance between the first large tooth 19 and the second large tooth 20 of the saw 17 while the distances designated "T" are the distances between two adjacent small teeth 18 of this saw 17. The piston 41 and the additional pawl 35 covers a distance B–T.

With the four-way valve 59 in the idle position of FIG. 1, as soon as the saw 17 reaches a position shown in FIG. 4, the said pulse reaches via contact 73a of the delay switch 73, the contact of the valve 59 reversing its position so that the pressure medium inlet 26 is put under pressure and the pressure inlet medium 27 is connected to the reservoir 56. Consequently, the piston 23 and the feed pawl 24 moves to the left from the starting position of FIG. 4 to the end position illustrated in FIG. 3 in dash-dot lines. The adjusting screw 29 is adjusted so that the distance between the starting position and the end position of the feed pawl 24 is in accord with the pitch distance T of the small teeth 18. Then the saw 17 which was advanced by the additional pawl 35 by the distance B–T is advanced further by the feed pawl 24 via distance T. The end position of the feed pawl 24 is the machining position for the first large tooth 19 so that this tooth is sharpened during the next downward stroke of the ram 13. The operating cycle described above is repeated so that after the first large tooth 19 is sharpened, the second large tooth 20 reaches its machining position and for that purpose the program switch 66 is computed so that its contact 66b is closed. Then as soon as the push-rod 13 again reaches its upper end position after the first large tooth 19 has been sharpened, the coil 68s of the switch system 68 is again energized via the end switch 69 so that the switch system 68 is advanced by one step and now connects the closed contact 66b of the program switch 68 through the contact 68b of the switch system 68 with the coil 71s of the electromechanical relay 71. Then the relay is attached and the afore-mentioned process is repeated.

After the second large tooth 20 has been sharpened and the ram 13 has returned to its upper end position, the step-by-step switch 68 again switches so that its contact 68c is closed. However, this remains ineffective when the program switch 66 is computed such that the contact 66c is open. The coil 71s of relay 71 during this time remains de-energized and consequently its contact 71b remains open and the four-way valve 60 remains in an idle position. As a consequence the motor 38 also remains in its idle position as is apparent from FIGS. 1 and 3. However, the coil of the four-way valve 59 receives the next pulse generated by the pulse generator 72 which takes place without delay as the contact 71a assumes the position illustrated in FIG. 1. In full lines in which it bridges the delay switch 73. It is the consequence of this switching that in this operating cycle, only the feed pawl 24 moves from its starting position drawn in full lines in FIG. 3 to its end position drawn in dash-dot lines and thereby advances the saw by the distance T. Now the ram 13 is again moved in a downward direction and during this the grinding disc 15 sharpens the first small tooth 18 of the next group of small teeth.

This last described working cycle is repeated twice by leaving open the contact 66b and only then a cycle takes place in which the additional pawl 35 advances the saw 17 by the value B–T before the feed pawl performs its advancing operation by the value T.

Figure 5:
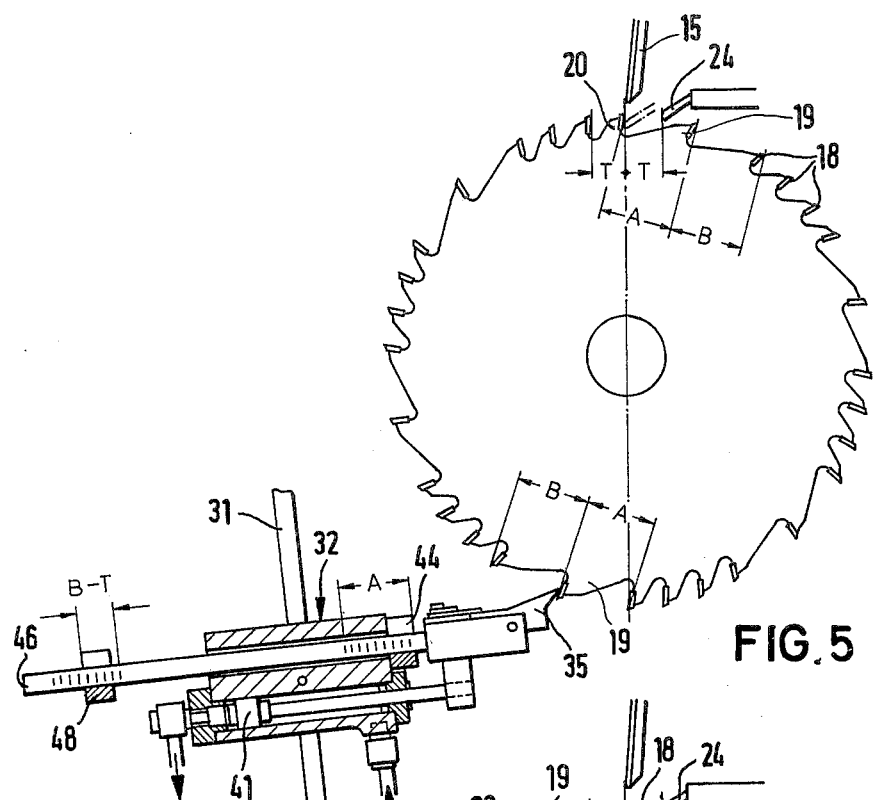
FIG. 5 is a side view of parts of the saw feeding device in a first operating position when advancing a second embodiment of a combination circular saw.
Figure 6:
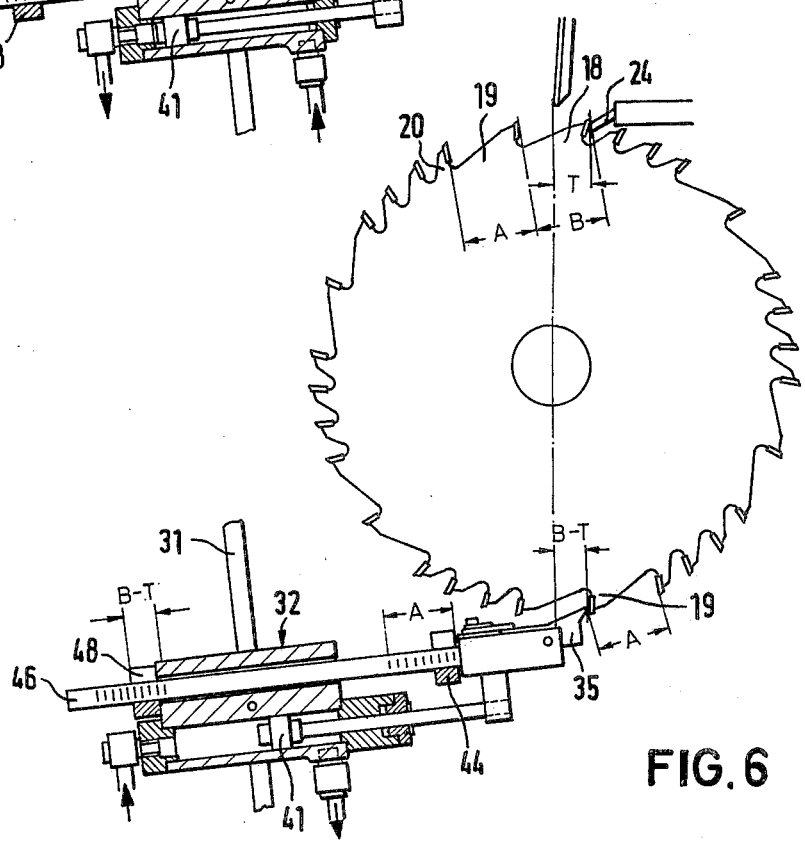
FIG. 6 is a side view corresponding to FIG. 5 showing the saw feeding device in the second operating position.

The saw 17 shown in FIGS. 5 and 6 differs from the saw shown in FIGS. 3 and 4 only in that the distance A between the last small tooth 18 of each group and the first large tooth 19 is greater than the distance B between the first large tooth 19 and the second large tooth 20. If sharpening this second embodiment of the saw 17 is to include sharpening all of the teeth 18, 19 and 20 during one revolution of the saw as in the first embodiment of the saw 17, then an additional pawl similar to the pawl 35 together with all of the mechanical, hydraulic and electrical appliances of FIG. 1 would have to be provided. To avoid this additional expense, the saw 17 in the embodiment of FIGS. 5 and 6 can have all of its small teeth 18 and the second large tooth 20 of each group sharpening during the first revolution of the saw leaving out the sharpening of a second large tooth 19. This is achieved, shown in FIG. 5, by offsetting the starting position of the additional pawl 35 to the left by a distance A with respect to the original diametrically opposite position. For this purpose, the right-hand stop 44 is displaced on the rod 33 from zero on the scale to the right by the distance A. The left-hand stop 48 remains unchanged. Then, the additional pawl 35 moves at each of its strokes without interruption by the valve A + B − T. Consequently, the first large tooth 19 is moved past the feeding pawl which only engages the second large tooth 20 to move the same into machining position as soon as the pressure medium inlet 26 of the motor 25 is put under pressure when the delay time of the delay switch 73 expires.

Figure 7:
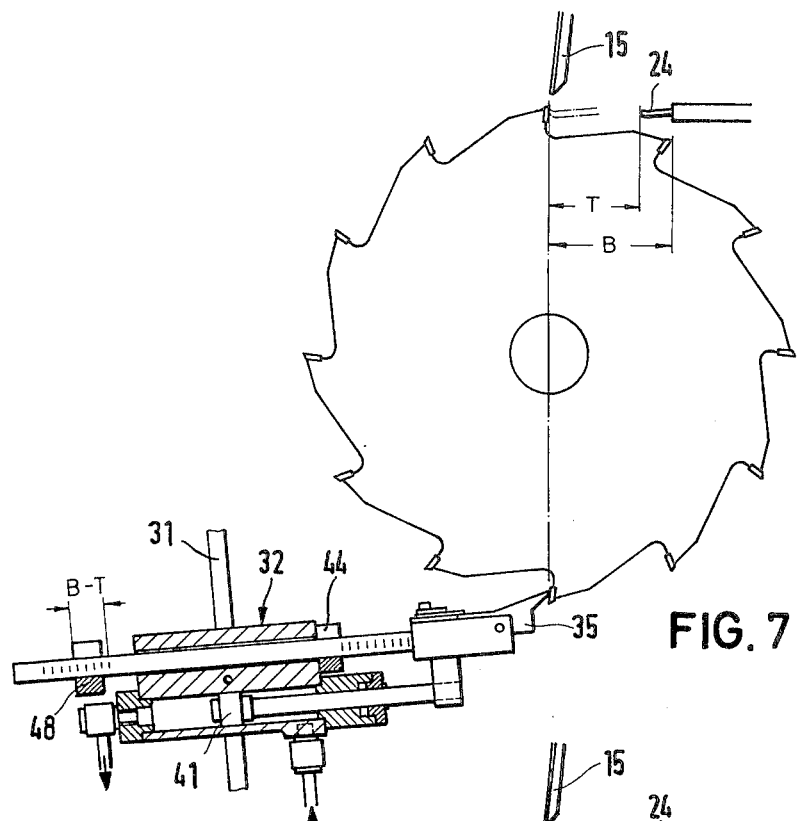
FIG. 7 is a side view of parts of the saw feeding device in a first operating position when advancing a circular saw with constant but wide tooth pitch.
Figure 8:
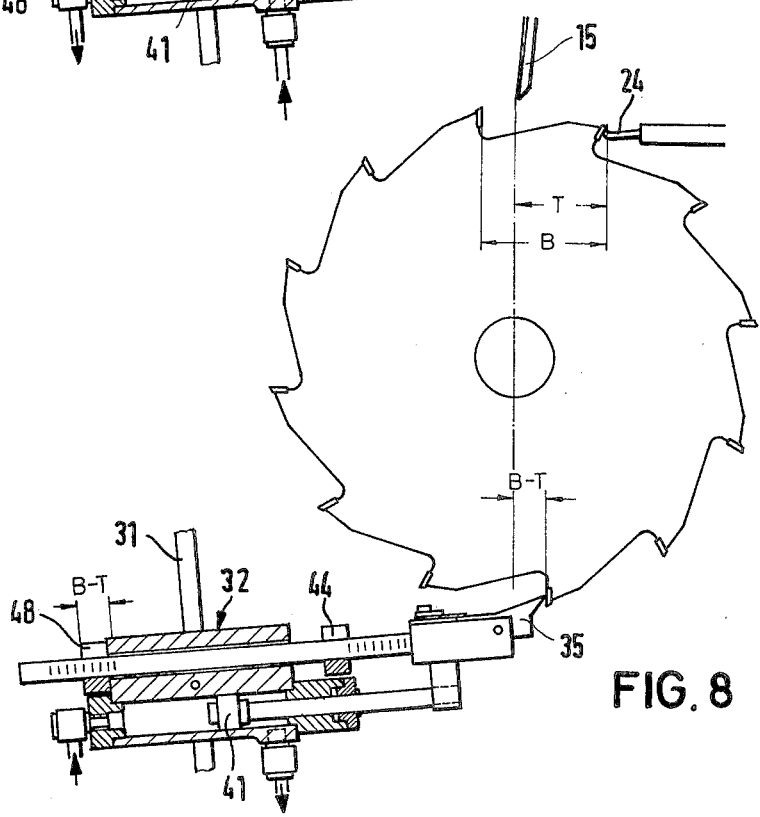
FIG. 8 is a side view corresponding to FIG. 7 showing the saw feeding device in the second operating position.

As shown in FIGS. 7 and 8, the saw feeding device above described is also suited for saws with constant teeth pitch greater than the largest pitch distance T that can be accommodated by the feeding pawl 24. When sharpening saws of the type shown in FIGS. 7 and 8, the program switch 66 is computed in such a manner that after each upward stroke of the push-rod 13, first the additional pawl 35, and subsequently the feeding pawl 24, is activated. It will be understood that the program switch 66 and the step-by-step switch system 68 can be omitted or bridged when the device of this invention sharpens saws as shown in FIGS. 7 and 8.

From the above descriptions it will be clearly understood that this invention provides feed mechanisms for saw machining apparatus which advance the saw in the machine so as to correctly position successive saw teeth for a machining operation regardless of the pitch distances between saw teeth and variation in pitch distances of a saw. The mechanism includes a first pawl assembly advancing the saw in the machine a predetermined distance and a second pawl assembly augmenting the advance of the first assembly in a controlled sequence and by a second predetermined distance.

I claim:

1. A saw feeding device for a saw machining apparatus which comprises a first mechanism acting on a saw in the machine to advance the saw a preset distance, a second mechanism acting on the saw to advance the saw in the machine in the same direction as the first mechanism a preset distance beyond the distance advanced by the first mechanism, and control means selectively activating said mechanisms for accurately positioning the teeth of the saw for a machining operation by said machining apparatus.

2. The device of claim 1 including means actuating said first and second mechanisms to reciprocate to engage the teeth of a saw in the machine on an advancing stroke and retract from said teeth on a reverse stroke.

3. The device of claim 1 wherein said saw machining apparatus mounts a circular saw, and said first and second feed mechanisms are positioned to act on diametrically opposite portions of the circular saw.

4. The device of claim 3 wherein said mechanisms are reciprocable feeding pawls engaging the saw teeth on diametrically opposite sides of the circular saw.

5. The device of claim 1 including fluid pressure operated motors advancing and retracting said first and second mechanisms and an electric control circuit for the fluid pressure media operating said motors to selectively and sequentially activate the motors.

6. A saw feeding device for a saw machining apparatus which comprises a reciprocable feeding pawl performing advance strokes from a starting position to an end position on a tooth of a saw for moving the tooth into a machining position and in said apparatus and then returning to its starting position, and an additional pawl adapted to perform advance strokes from its own starting position into its own end position on a tooth of the saw in said apparatus, means operating said additional pawl to perform its advance strokes between the strokes of the feeding pawl whereby said additional pawl advances a saw tooth by an adjustable distance in said machine and then returns to its starting position, means controlling the end position of the additional pawl relative to the starting position of the feeding pawl so that the additional pawl advances the saw selectively a zero distance or distance equal to the distance between a plurality of successive teeth of the saw so that the sum of each advance stroke of the feeding pawl and the additional pawl at least equals the greatest distance between adjacent teeth of the saw.

7. The saw feeding device of claim 6 including adjustable stop means controlling the starting position and the end position of the additional pawl.

8. The saw feeding device of claim 7 including a scale associated with the stop means and marked so that in a zero position on the scale the stroke of the additional pawl equals zero, and upon adjustment of the stop means into the direction of increasing scale values, the end position of the pawl is increased in a forward direction corresponding to the direction of the feed of the saw and the starting position is increased in a rearward direction.

9. The saw feeding device of claim 7 wherein the machining apparatus mounts a circular saw, the stop means defines the starting position of the additional pawl and the starting position of the additional pawl is located diametrically opposite the end position of the feeding pawl.

10. The saw feeding device of claim 6 in which the saw machining apparatus has a machining device operating in a stroke toward and away from a saw mounted in the apparatus, the additional pawl and a feed pawl are each driven by a separate fluid pressure motor, a pulse generator actuated by the stroke of the saw machining apparatus control said motors, the motor for the additional pawl includes a control switch actuated by a step-by-step switch system and the motor for the feeding pawl is controlled by a delay switch actuated by the additional pawl in its end position.

11. The saw feeding device of claim 10 including a control circuit for the motor of the feeding pawl, a delay switch in said control circuit bridged by a switch controlled by the step-by-step switch system when said switch system is in its idle position in which the additional pawl is inoperative.

12. The device of claim 2 including means activating the second mechanism between the strokes of the first mechanism.

* * * * *